United States Patent Office 3,491,174
Patented Jan. 20, 1970

3,491,174
METHOD FOR MAKING INTEGRALLY COLORED ASBESTOS-CEMENT PRODUCTS
Richard B. Hamme, Tonawanda, and Robert M. Johnson, Kenmore, N.Y., assignors to National Gypsum Company, Buffalo, N.Y., a corporation of Delaware
No Drawing. Filed Nov. 8, 1966, Ser. No. 592,744
Int. Cl. B28b *11/08;* C04b *15/12;* B29h *9/10*
U.S. Cl. 264—82                                6 Claims

---

ABSTRACT OF THE DISCLOSURE

Integrally colored asbestos-cement sheets are produced in a method involving the use of inorganic pigments which are unstable in the autoclave-cure cycle. The wet sheet containing magnetite after being steam autoclaved is exposed to air at elevated temperatures to form a random, variegated coloration. The sheet may be embossed and coated with moisture curing polyurethane resin to form an abrasion resistant stone-like textured article.

---

The present invention relates to durable, moisture resistant and abrasion resistant asbestos-cement articles and to the method of forming such articles. More particularly, the invention relates to high density, integrally colored, textured asbestos-cement articles which are moisture resistant and abrasion resistant, the articles being particularly well suited for use as a permanent flooring.

In recent years there has been an increasing demand for variety in flooring materials for use in home and commercial construction. This increasing demand has resulted in the use, as flooring material, of natural stone materials such as slate, marble, terrazzo, travertine, and the like. The natural texture and coloring of such stone materials together with their durability make these materials desirable for use as flooring material. Despite the known advantages, the use of natural stone products as permanent flooring has been rather limited, due primarily to the high cost involved in processing the stone to provide suitable flooring material. In addition, the natural stone products, which are generally supplied in the form of plates or tiles one-quarter to one-half inch thick, have relatively poor impact resistance and abrasion resistance, and are difficult to cut to size during installation, which also detract from their use as flooring material. In order to meet the increasing demand for the use of natural stone flooring material and to overcome the disadvantages of natural stone products, a number of flooring manufacturers have made available in recent years, resilient flooring such as asphalt tile, vinyl tile, vinyl-asbestos tile, and the like which are intended to imitate the coloring and texture of natural stone tile. However, such imitation stone tile available heretofore have generally been characterized by an artificial brilliance of the colors and by a lack of depth to the texture, so that such tile fail to capture the texture and beauty of the natural stone material. In addition, the resilient tile imitations lack the permanence of the natural stone material.

It is therefore an object of the present invention to provide a wear-resistant flooring tile having the texture and appearance of natural stone products.

Another object of the invention is to provide an integrally colored, moisture resistant and abrasion resistant asbestos-cement article, textured to simulate natural stone.

Another object is to provide an asbestos-cement flooring tile having a tough, flexible, abrasion resistant finish.

Another object is to provide a method for producing integrally colored asbestos cement articles having a variegated, random surface coloring.

Various other objects and advantages will appear from the following description of the invention, and the novel features will be particularly pointed out hereinafter in the appended claims.

These and other objects are attained by the present invention which provides a durable flooring tile formed of asbestos-cement which is integrally colored and textured to simulate natural stone, and is coated with a tough, flexible, wear-resistant, moisture resistant finish. Asbestos-cement products, as they are conventionally made and marketed, lack a number of features which are essential in a permanent flooring material. Thus, while asbestos-cement products, which are composed of a uniform mixture of a hydraulic cement, asbestos fibers and fillers, possess the strength, impact resistance and handleability necessary for use as a flooring tile, such products lack abrasion-resistance, moisture resistance, and stain resistance. As a result, asbestos-cement products have generally been considered to be unsuitable for use as a durable flooring material. According to the present invention, asbestos-cement tile, which may be formed in a variety of shapes and sizes, are integrally colored by the addition of non-fading inorganic pigments to the cement-asbestos fiber mix, are textured by a press roll to provide the asbestos-cement pieces with a surface simulating the texture of a natural stone material, and are subsequently impregnated and coated with a clear, moisture cure urethane resin, thereby providing an asbestos-cement product, having the texture and coloring of natural stone, and having the abrasion resistance, moisture resistance and stain resistance required in a product which is to be used as a flooring material.

The asbestos-cement sheet itself is formed by the conventional wet or Hatschek method in which an aqueous slurry of hydraulic cement, asbestos fibers and fillers is formed in one or more cylinder vats and is picked up on an endless felt by which it is carried to an accumulator roll, where it is wound a number of times to a desired thickness, usually between one-quarter and one-half inch. The material is then stripped from the accumulator roll, textured and cured. Preferably, the sheets are cured by autoclaving.

In order to simulate the coloring of natural stone flooring tile, inorganic pigments of the desired color are pre-blended with the cement and fillers in a dry mixer. This color mix and asbestos fibers are then added to a wet mixer and thoroughly agitated before addition of water and transfer of the mix to the cylinder vats at a solids content of between 3% and 25%. This procedure facilitates uniform dispersion of the pigment throughout the fibrous mix. Uniform dispersion of the pigments is further facilitated by the use of finely divided pigments, preferably minus 325 mesh in size. Only a small amount, generally from about 0.3% to 10% by weight of the total dry mix, of the pigment is incorporated in the mix. Suitable non-fading inorganic pigments which may be used include red and black iron oxides, chromium oxide green, titanium oxide, chromium-alumina-cobalt containing materials and the like, including mixtures of these materials, to provide varying shades of green, red, gray, blue and black which simulate the coloring of the natural stone material, such as slate.

According to an embodiment of this invention, pigments which are unstable in the autoclave cycle of curing the asbestos cement, are incorporated in the mix, either as the sole pigmentary material or in combination with stable pigments. The use of such pigments which are unstable to oxidizing conditions at high temperatures, generally considered to be objectionable in autoclaved asbestos-cement products due to the non-uniform coloring produced by the steam pressure and temperature atmosphere in the autoclave, in this present invention results in the formation of simulated natural stone tile having a random, variegated coloration, which aids in giving each tile an individual appearance. Thus, it has been found that pigments containing a high percentage of magnetite, when incorporated in an asbestos-cement mix, will undergo oxidation, under certain conditions, at the elevated temperatures encountered in the autoclaving cycle, with the result that the original dark brown or black color will redden non-uniformly. In order to achieve this color change, which provides the tile with a variegated coloration, it has been found that the tile must be exposed to an oxidizing atmosphere while the temperature of the autoclave is above about 200° F. following the completion of the autoclave curing cycle. For example, asbestos-cement tile, containing about 0.5% by weight of the dry mix of a pigment containing 96% magnetite, when exposed to air while the autoclave temperature was above 200° F. following the autoclave cure cycle, took on a definite reddish hue in some portions of the tile while in other portions the gray color of the pigment was retained. The overall result was to produce a tile having a mottled red-gray surface of unique appearance.

In order to provide the asbestos-cement flooring tile of this invention with the texture of a natural stone material, the asbestos-cement, while still in a non-rigid condition is contacted with an embossing roll which imparts the desired texture to the asbestos-cement. The asbestos-cement sheet formed on the accumulator roll has a water content of about 20% to 35% and is sufficiently plastic and non-rigid to be textured by contact with an embossing roll. The embossing roll has on its surface grooves and ridges corresponding to the texture of the natural stone product to be simulated, and may be formed of any material capable of accurate pattern reproduction. The embossing roll is pressed against the non-rigid asbestos-cement sheet at a pressure of about 150 to 300 p.s.i., so that the surface of the sheet is forced to conform to the surface of the roll, thereby imparting the natural stone texture to the asbestos-cement. The asbestos-cement sheet is then hardened to rigidify the material and maintain the texture. The sheets are then cured, preferably by autoclaving in an atmosphere of high pressure, saturated steam, as is generally well known in the production of asbestos-cement products.

While it has generally been considered to be advantageous to trim the asbestos-cement sheets to the size of the finished product prior to the autoclave curing cycle, since the sheets are still non-rigid before curing and may be cut and trimmed with little difficulty, it has been found that trimming the sheets to finished size before autoclaving tends to facilitate the formation of autoclave bloom on the surface of the asbestos-cement pieces. This bloom, which consists of hydrated calcium silicate salts formed at the surface of the sheets during autoclaving, is unsightly and must be removed, such as by washing with a dilute acid solution. It has been discovered that if the asbestos cement sheets are not trimmed prior to the autoclave cure cycle, but are cured in the form of relatively large sheets, the blooming is substantially reduced, if not eliminated entirely. The cured sheets are then cut or trimmed to finished tile sizes after the autoclave cure cycle.

As noted hereinabove, while asbestos-cement possesses the strength, impact resistance and handleability necessary for use as a permanent flooring material, it lacks certain other properties, such as abrasion resistance, moisture resistance and stain resistance, which makes the product, as available heretofore, generally unsuitable for use as flooring tile. These disadvantages have been overcome in the present invention by impregnating and coating the integrally colored, textured, asbestos-cement substrate with a clear, tough, flexible, film-forming resin. In order to be suitable for use in this invention, the clear resin must not only provide the asbestos-cement with moisture resistance, stain resistance and abrasion resistance, but the resin must also be one which is readily adaptable for application at a high rate of production and cures to a tack-free state within a relatively short period of time. Moisture curing polyurethane resins have been found to provide the best combination of desirable physical properties and ease of application for use as the finish coating in the present invention. Such moisture-curing polyurethane resins provide on the asbestos-cement substrate, a clear film which is characterized by extreme toughness, abrasion resistance, flexibility and moisture resistance. Curing of the resin is rapid, thereby making its use desirable in a high speed commercial operation, and does not require the use of a separate catalyst, for the curing mechanism is effected by the reaction of the resin with ambient moisture. A catalyst may, of course, be used if a faster cure time is desired. Similarly, the cure of the resin may also be accelerated at high relative humidities and temperatures in the range of about 100°–200° F. Temperatures much above 300° F. are to be avoided since the use of such higher temperatures tends to cause degradation of the resin.

Generally it is preferred to apply the moisture-cure urethane resin coating in a two-step procedure, namely, a base or sealer coating which is applied over all the surfaces of the tile to seal the surfaces, and a top or finish coating which is usually applied only over the upper surface of the tile which is to provide the actual flooring surface. The moisture-curing polyurethane resin is generally applied in the form of a solvent solution of the resin, the solution containing between about 15% and 50% resin solids. The urethane resin may be solvated with aromatic hydrocarbon solvents, such as xylene and toluene; ether solvents, such as Cellosolve acetate and ethyl acetate; and with mixtures of such aromatic hydrocarbon and ether solvents. Since the resin is moisture curing, such solvents should be substantially free of water. Aliphatic hydrocarbon solvents are not compatible with the resin. Preferably the base or sealer coating is applied by spraying or dipping the cured, textured asbestos-cement tile in a solution of the urethane resin to provide a resin loading of about 15 to 20 wet grams per square foot of tile. The resin, which impregnates into the asbestos-cement substrate and seals the surfaces, may be cured by standing at room temperature. The top or finish coating is generally applied by spraying or rolling the resin solution, at a solids content of about 25–40%, on the top, textured surface of the tile at a resin loading of between about 6 to 12 wet grams per square foot of tile, the urethane resin top coating forming a continuous film over the textured surface of the tile. A catalyst may also be included in the polyurethane resin top coating in order to accelerate the cure of the resin. Excellent results have been obtained by including in the urethane resin solution from about 1% to 4% by weight, based on the resin solids, of a triethylene diamine catalyst. Other catalysts, which accelerate the cure of the moisture-cure urethane resin may also be used.

The following preferred embodiment is illustrative of the present invention but is not intended to limit the invention to materials, proportions or conditions set forth therein.

An asbestos-cement tile having the texture, appearance and coloring of natural slate was formed according to the conventional Hatchek method and was then textured in the manner described hereinbelow. Thus, a dry autoclave mix of Portland cement, asbestos fibers, silica and limestone and having about 0.5% by weight of a pigment containing 96% magnetite uniformly dispersed therein was formed into an aqueous slurry having a solids content of between 3% and 25% and was introduced into the molds of a conventional cylinder forming machine. A wet sheet of asbestos-cement was formed on the cylinder machine and passed through a drier to remove surface moisture. The sheet, still plastic and non-rigid, was then cut into mats about 16″ x 50″ in size, and the mats textured by contacting them with an embossing roll having on its surface grooves and ridges corresponding to the texture of natural slate. The embossing roll was pressed against the wet asbestos-cement mats at a pressure of about 250 p.s.i. so that the surface of the mats conformed to the surface of the embossing roll, thereby imparting the texture of natural slate to the asbestos-cement mats. The textured mats were then partially cured by storing them at room temperature for four days, and the pre-cured mats were then fully cured by autoclaving for 12 hours at 115 p.s.i. After completion of the autoclave cycle, and while the temperature of the autoclave was still above about 200° F., the autoclave door was opened to expose the cured sheets. The cured asbestos-cement took on a definite reddish hue in some portions, while in other portions a gray color was maintained. The overall effect was to produce a random, variegated color pattern in the material. Upon cooling, the mats were cut to finished tile sizes.

A base coating of a moisture-curing polyurethane resin was then applied by immersing the tile in a solution of the resin, the solution containing about 20% resin solids in a solvent mixture of xylene and Cellosolve acetate, both solvents having a moisture content of less than 0.5%. The tile was immersed in the resin solution so that about 15 to 20 wet grams of resin per square foot was impregnated into the tile. The tile was then allowed to stand at room temperature for about 45 minutes, after which time it was heated to provide a surface temperature of 100°–120° F. A resin solution of the same moisture-curing polyurethane resin in a solvent solution of xylene and Cellosolve acetate was then sprayed on the textured surface of the tile at a loading of about 8 to 10 wet grams per square foot of resinous solids. This resin solution also contained about 3% by weight, based on the resin solids, of triethylene diamine catalyst. The coated tile was then heated at 160° F. for 6 to 8 minutes to dry and cure the resin.

In order to demonstrate the superior moisture resistance and abrasion resistance of tile made according to the present invention, as compared to conventional asbestos-cement products made in the same manner but not having the resin coating, a series of comparable tests were run, the results of which are reported below.

In order to compare the moisture resistance of products of this invention with conventional asbestos-cement products, a container having a measured amount of water was inverted on the surface of a tile of the present invention, and an identical container having the same amount of water was inverted on the surface of a conventional asbestos-cement tile having no resin coating. The amount of water absorbed by each tile is reported in Table 1.

TABLE 1

| Time (hrs.) | Water absorption (percent) | |
|---|---|---|
| | Uncoated tile | Resin coated tile |
| 1 | 9.4 | 0.9 |
| 2 | 16.5 | 1.0 |
| 6 | 32.5 | 1.3 |
| 8 | 38.2 | 1.5 |

The results of this test clearly show that the tile of the present invention have outstanding moisture resistance.

In order to determine the abrasion resistance of tile of the present invention as compared to conventional uncoated asbestos cement tile and natural slate tile, samples of each material were tested on a Granule Embediment Tester, in which the material to be tested was affixed to a moveable platform which oscillated beneath a stationary head. A stiff bristled wire brush, having a loading of 20 pounds was applied against the surface of the sample. Abrasion resistance was determined as weight loss, in grams, for a given number of oscilaltions, and is reported in Table 2.

TABLE 2

| Number of cycles | Total weight loss (gms.) | | |
|---|---|---|---|
| | Urethane resin coated tile | Uncoated tile | Natural slate |
| 50 | .02 | .20 | .33 |
| 100 | .03 | .47 | .55 |
| 500 | .05 | | |

The results of this test clearly show that the tile of the present invention are not only markedly superior in abrasion resistance to conventional uncoated asbestos-cement, but are also decidedly superior to natural slate.

While the moisture curing polyurethanes resin described hereinabove provides an abrasion-resistant finish for the tile, it is to be understood that a durable abrasion resistance finish is not provided by all film forming resins, nor even by all urethane resins. For example, epoxy resins are not suitable for they lack flexibility and tend to crack and chip off after short periods of use. Phenolic and polyester resin coatings have also been found to be unsatisfactory. An oil modified polyurethane resin coating was found to lack sufficient abrasion resistance. Thus, an asbestos-cement substrate prepared as described hereinabove was impregnated and coated with an oil modified urethane resin, and the abrasion resistance of the cured resin compared with the abrasion resistance of a tile of the present invention and with a natural slate tile. The test for abrasion resistance was performed on a Taber abraser according to Federal Specification SS–T–308B, using H–22 Calibrade Wheels under a 1000 gram load for 1000 cycles. Abrasion resistance, as determined by this test, is reported as the wear index, which is a measure of serviceability in weight loss, a higher index indicating less loss and better performance. The results are reported in Table 3.

TABLE 3

| Sample | Coating | Weight loss (gms.) | Wear index |
|---|---|---|---|
| Asbestos-cement | Oil-modified urethane | .68 | 76 |
| Do | Moisture cure urethane. | .21 | 267 |
| Slate | None | 2.43 | 45 |

As shown by the wear index, the tile of the present invention is markedly superior.

It will be understood that various changes in the details, materials, steps and arrangements which have been herein described in order to explain the nature of the invention may be made by those skilled in the art, within the principle and scope of the invention as set forth.

We claim:
1. A method of producing an integrally colored, abrasion resistant and wear resistant asbestos-cement sheet having a natural stone texture, which comprises:
 forming a wet sheet of asbestos-cement from an aqueous slurry of a hydraulic cement, asbestos fibers, fillers and non-fading, inorganic pigments, said pigments being uniformly dispersed throughout said sheet,
 pressing said wet sheet against an embossing surface so that the surface of said wet sheet becomes textured, said embossing surface having grooves and ridges corresponding to the texture of the natural stone product to be simulated,
 autoclaving said textured asbestos-cement sheet to cure and harden the sheet, and
 impregnating and coating the cured asbestos-cement sheet with a clear, moisture curing polyurethane resin and curing said resin whereby an abrasion resistant, moisture resistant finish is formed on said textured sheet, said impregnating and coating consisting of immersing said sheet in a solvent solution of said resin containing between 15% and 50% resin solids whereby the resin is impregnated into said sheet at a loading of about 15 to 20 wet grams of resin per square foot, said resin being solvated in a mixture of xylene and Cellosolve acetate, both of which are substantially free of moisture, curing said resin by exposure to ambient moisture, forming a finish coating of a moisture curing polyurethane resin over the textured surface of said sheet by applying a solvent solution of said resin to said textured surface at a resin loading of between 6 to 12 wet grams of resin per square foot, said resin solution having a solids content of between 25% and 40% with the resin being solvated in a mixture of xylene and Cellosolve acetate, both of which are substantially free of moisture, said resin solution containing from 1% to 4% by weight, based on the resin solids, of a catalyst which increases the cure rate of the resin, and curing said resin so that an abrasion resistant, moisture resistant finish is formed over said asbestos-cement sheet.

2. The method as defined in claim 1 in which:
the solvents of said solvent solutions are selected from the group consisting of aromatic hydrocarbons, ether solvents, and mixtures thereof, said solvents having a moisture content of less than 0.5%.

3. The method as defined in claim 1 in which said wet sheet of asbestos cement is formed from an aqueous slurry containing between 0.3% and 10% of an inorganic pigment which is unstable in the autoclave cure cycle so that a random, variegated coloration is formed in the sheet.

4. The method as defined in claim 3 in which said unstable pigment is magnetite and wherein said autoclaving is in an atmosphere of saturated steam at a pressure of from 100 to 125 p.s.i. and a temperature between 330° and 350° F. for between 8 and 20 hours, and wherein said cured sheets are thereafter exposed to air at a temperature above 200° F.

5. The method of producing an integrally colored asbestos-cement sheet having a natural stone texture which comprises:

forming a wet sheet of asbestos-cement from an aqueous slurry of a hydraulic cement, asbestos fibers, fillers and non-fading, inorganic pigments, said pigments being present in an amount equal to between 0.3% and 10% of the total dry weight of said wet sheet and including at least 0.3%, based on total dry weight, of an inorganic pigment which is unstable in and autoclave cure cycle so that a random variegated coloration is formed in the sheet, curing said asbestos-cement sheet by autoclaving the sheets in an atmosphere of saturated steam at a pressure of from about 100 to 125 p.s.i. and a temperature between 330° and 350° F. for between 8 to 20 hours, and exposing the cured sheets to air after completion of the autoclave cycle while at a temperature above 200° F.

6. The method as defined in claim 5 in which said unstable pigment is magnetite.

References Cited

UNITED STATES PATENTS

| 2,407,514 | 9/1946 | Rembert | 264—119 |
| 2,818,824 | 1/1958 | Read | 264—284 XR |
| 2,859,484 | 11/1958 | French | 18—60 |
| 3,010,940 | 11/1961 | Charlton | 260—47 |
| 3,219,735 | 11/1965 | Iverson | 264—73 |
| 3,341,396 | 9/1967 | Iverson | 264—73 XR |
| 2,058,167 | 10/1936 | McQuade | 25—154 |
| 2,307,733 | 1/1943 | De Vault | 264—293 XR |
| 3,327,032 | 6/1967 | Adams | 264—82 |

ROBERT F. WHITE, Primary Examiner

R. R. KUCIA, Assistant Examiner

U.S. Cl. X.R.

264—73, 129, 234, 293